United States Patent
Dannenberg et al.

(10) Patent No.: US 10,222,553 B2
(45) Date of Patent: Mar. 5, 2019

(54) MULTIPLEXER/DEMULTIPLEXER USING STAMPED OPTICAL BENCH WITH MICRO MIRRORS

(71) Applicant: NANOPRECISION PRODUCTS, INC., El Segundo, CA (US)

(72) Inventors: Rand Dannenberg, Newbury Park, CA (US); Robert Ryan Vallance, Newbury Park, CA (US); Jeremy Burke, Los Angeles, CA (US)

(73) Assignee: NANOPRECISION PRODUCTS, INC., Camarillo, CA (US)

( * ) Notice: Subject to any disclaimer, the term of this patent is extended or adjusted under 35 U.S.C. 154(b) by 0 days.

(21) Appl. No.: 15/864,579

(22) Filed: Jan. 8, 2018

(65) Prior Publication Data

US 2018/0329146 A1 Nov. 15, 2018

Related U.S. Application Data

(63) Continuation of application No. 15/236,390, filed on Aug. 12, 2016, now Pat. No. 9,864,145.

(60) Provisional application No. 62/204,367, filed on Aug. 12, 2015.

(51) Int. Cl.
*G02B 6/42* (2006.01)
*G02B 6/293* (2006.01)
*G02B 6/32* (2006.01)
*H04J 14/02* (2006.01)

(52) U.S. Cl.
CPC ....... *G02B 6/29367* (2013.01); *G02B 6/2938* (2013.01); *G02B 6/32* (2013.01); *H04J 14/02* (2013.01); *G02B 6/4214* (2013.01); *G02B 6/4255* (2013.01)

(58) Field of Classification Search
None
See application file for complete search history.

(56) References Cited

U.S. PATENT DOCUMENTS

| | | | |
|---|---|---|---|
| 5,479,540 | A | 12/1995 | Boudreau |
| 5,577,142 | A | 11/1996 | Mueller-Fiedler |
| 5,911,022 | A | 6/1999 | Plickert |
| 6,402,394 | B1 | 6/2002 | Heinrich et al. |
| 6,757,308 | B1 | 6/2004 | Eldring et al. |
| 6,870,976 | B2 | 3/2005 | Chen et al. |

(Continued)

FOREIGN PATENT DOCUMENTS

| | | |
|---|---|---|
| WO | 2006134675 | 12/2006 |
| WO | 2015026335 | 2/2015 |

OTHER PUBLICATIONS

International Search Report of Counterpart PCT International Application No. PCT/US2016/058554.

(Continued)

*Primary Examiner* — Tina M Wong
(74) *Attorney, Agent, or Firm* — Liu & Liu

(57) ABSTRACT

A Mux/Demux subassembly includes a stamped optical bench, which includes an array of stamped reflective surfaces for redirecting optical signals. Alignment features and components of the Mux/Demux subassembly are integrally formed on a stamped optical bench, defining a desired optical path with optical alignment at tight tolerances. The optical bench is formed by stamping a malleable stock material (e.g., a metal stock), to form precise geometries and features of the optical bench.

20 Claims, 4 Drawing Sheets

(56) References Cited

U.S. PATENT DOCUMENTS

| | | |
|---|---|---|
| 6,960,032 B2 | 11/2005 | Eldring et al. |
| 7,198,416 B2 | 4/2007 | Ray et al. |
| 7,298,941 B2 | 11/2007 | Palen |
| 7,311,449 B2 | 12/2007 | Barnoski |
| 7,343,770 B2 | 3/2008 | Barnoski |
| 7,800,734 B2 | 9/2010 | Komatsuda |
| 7,832,944 B2 | 11/2010 | Hosking et al. |
| 7,959,975 B2 | 6/2011 | Millward |
| 8,186,892 B2 | 5/2012 | Hosking et al. |
| 8,434,872 B2 * | 5/2013 | Maekawa ........... G02B 27/2292 353/10 |
| 8,488,244 B1 | 7/2013 | Li |
| 8,540,437 B2 | 9/2013 | Lee et al. |
| 8,909,058 B2 | 12/2014 | Sheu |
| 8,936,403 B2 | 1/2015 | Howard et al. |
| 8,961,034 B2 | 2/2015 | Li |
| 9,112,330 B2 | 8/2015 | Gronenborn |
| 9,213,148 B2 | 12/2015 | Li |
| 9,297,972 B2 | 3/2016 | Logan, Jr. et al. |
| 9,400,360 B2 | 7/2016 | McColloch |
| 2004/0091268 A1 | 5/2004 | Hogan et al. |
| 2005/0069013 A1 | 3/2005 | Bhandarkar et al. |
| 2010/0006784 A1 | 1/2010 | Mack et al. |
| 2013/0044362 A1 | 2/2013 | Commander |
| 2013/0148966 A1 | 6/2013 | Kurokawa et al. |
| 2013/0148969 A1 | 6/2013 | Sheu |
| 2013/0294732 A1 | 11/2013 | Li et al. |
| 2013/0322818 A1 | 12/2013 | Li |
| 2014/0205246 A1 | 7/2014 | Li |
| 2014/0248057 A1 | 9/2014 | Li et al. |
| 2015/0124336 A1 | 5/2015 | Kaufman |
| 2015/0338585 A1 | 11/2015 | Li |
| 2015/0355420 A1 | 12/2015 | Li |
| 2016/0016218 A1 | 1/2016 | Li |
| 2016/0161686 A1 | 6/2016 | Li |

OTHER PUBLICATIONS

Epitaux et al., "Silicon Optical Benches for Next Generation Optical Packaging: Going Vertical or Horizontal", 2005 55th Electronics Components & Technology Conference, vol. 2, Jan. 1, 2005, pp. 1339-1342.

Beranek et al., "Hermetically Sealed Fiber-Optic Transmitter Based on Silicon Micro-Optical Bench Optical Subassembly & Multilayer Thick Film Interconnect", Proceedings of SPIE—The International Society for Optical Engineering 1999, Society of Photo-Optical Instrumentation Engineers, vol. 3906, 1999, pp. 468-473.

International Search Report of Counterpart PCT International Application No. PCT/US2016/046936.

* cited by examiner

MULTIPLEXER/DEMULTIPLEXER USING STAMPED OPTICAL BENCH WITH MICRO MIRRORS

PRIORITY CLAIM

This application is a continuation of U.S. patent application Ser. No. 15/236,390 filed on Aug. 12, 2016, which claims the priority of U.S. Provisional Patent Application No. 62/204,367 filed on Aug. 12, 2015. These applications are fully incorporated by reference as if fully set forth herein. All publications noted below are fully incorporated by reference as if fully set forth herein.

BACKGROUND OF THE INVENTION

1. Field of the Invention

The present invention relates to optical bench subassemblies, particularly optical fiber subassemblies based on optical benches, and more particularly wavelength multiplexer/demultiplexer (MUX/DEMUX) modules/subassemblies based on optical benches.

2. Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit multiple specific optical signals. The data communication systems involve devices that couple fibers in an end-to-end relationship, including optoelectronic or photonic devices that include optical and electronic components that source, detect and/or control light, converting between light signals and electrical signals, to achieve high speed and high capacity data communication capabilities.

The fiber optics communication networks continue to demand increasing bandwidths and flexibility to different communication protocols. Wavelength division multiplexing (WDM) is an exemplary technology that puts data from different sources together on an optical fiber with each signal carried at the same time on its own separate light wavelength. Using the WDM system, separate wavelengths or channels of data can be multiplexed into a light stream transmitted on a single optical fiber. There can be coarse (CWDM) and dense (DWDM). Often the WDM devices use thin-film bandpass filters and mirrors as part of the optical system doing the wavelength based optical signal splitting. Instead of or in addition to thin film filters, prisms and arrayed waveguides (sometimes called phased arrays) are used.

From a terminology viewpoint, a device that multiplexes different wavelength channels or groups of channels into one fiber is a multiplexer, and a device that divides the multiplexed channels or groups of channels into individual or subgroups of channels is a demultiplexer. Specifically, a multiplexer combines several channels of optical signals into a single signal, or in reverse, a demultiplexer separates a single multichannel signal into several individual channel signals, such devices are referred to as a multiplexing or demultiplexing module, or simply multiplexer or demultiplexer.

Multiplexers/De-multiplexers (Mux/DeMux) are needed in optical modules such as quad small-form-factor pluggable (QSFP) transceivers. The QSFP is a full-duplex optical module with four independent transmit and receive channels. It is designed to replace four single-channel small-form-factor pluggable (SFP) and in a package only about 30% larger than the standard SFP. To equip a QSFP and similar transceivers requiring multiple wavelengths, a small Mux and DeMuxdevice is very important. Accordingly, there is a great need for such optical modules being made small, and at the same time, the modules so designed are amenable to small footprint, broad operating wavelength range, enhanced impact performance, lower cost, and easier manufacturing process.

In a prior art thin-film filter-based multiplexer, light of one wavelength per fiber is launched through a collimating lenslet and its associated bandpass filter directly above it, bouncing between the filters that reflect all but the transmission wavelength, and a reflector plane. The combined beam is reflected through an exit lenslet and focused for coupling into a single fiber. For example, a MUX/DEMUX for multi-mode fiber uses a molded optic, and employs both thin-film filters and a lens array.

U.S. Pat. No. 8,488,244 discloses designs of optical devices providing multiplexing or demultiplexing functions. According to one disclosed embodiment, an optical device or an assembly employs an array of micro lenses, an array of filters and a glass block all bonded onto a substrate to provide multiplexing or demultiplexing functions. To compensate for possible errors caused by some or all of these components, one or more compensatory optical plates are provided to respectively correct these errors. Depending on implementation, the compensatory optical plates may be designed differently to correct various errors.

FIG. 1 shows an exemplary configuration 300 of a Mux/DeMux assembly according to one embodiment disclosed in U.S. Pat. No. 8,488,244. One of the disclosed benefits, advantages and objectives of the present invention is to provide such an optical device with the size and functionalities for small form factor transceivers such as QSFP transceivers.

According to the disclosure in U.S. Pat. No. 8,488,244, and as shown in FIG. 1, all major components such as a collimator 302, a glass block 304 and a micro-lens array 306 are bonded to a substrate 308. As a result, at least two distinctive features are shown in comparison to the prior art: 1) channels on one side of the device are used with filters on the other side replaced by a high-reflectance coating which reflects light with all wavelengths; 2) channel collimators were replaced by a micro-lens array. In this design, a collimated beam bounces twice before reaching the next channel. When using as a DeMux, after passing the filter, the light beam for each channel is then focused by a micro-lens with a receiver located at or around the focal point of the micro-lens. The device can be used as Mux or DeMux with transmitter/receiver array pitch matches with the pitch of the micro-lens. The convex side of micro-lens can face either a filter array or a transmitter/receiver array.

In operation, a light beam is projected into the collimating lens 302. A segment anti-reflective coating 312 on the glass block 304 transmits the light beam through the glass block 304. The light beam hits the filter array 310 that includes four filters, each is made or configured to allow one specified wavelength to pass through and reflects others. A first filter in the filter array 310 allows a wavelength to transmit through. The transmitted wavelength is projected into the micro-lens array 306. A corresponding lens on the micro-lens array 306 couples the transmitted wavelength out to a receiver. Depending on application, an array of electronic devices 316 may be a laser diode (LD), GaAs PIN photodiode or other type of device to receive the transmitted wavelength (signal) or to transmit one or more signals into the assembly 300.

Meanwhile, the first filter in the filter array 310 reflects other wavelengths. The reflected wavelengths transmit in the glass block 304 and hit a high-reflection (HR) coating on the glass block 304 that reflects the reflected wavelengths back to a second filter in the filter array 310. Similar to the first filter, the second filter transmits one wavelength and reflects all others. The transmitted wavelength goes through a corresponding lens on the micro-lens array 306 to couple the transmitted wavelength (signal) out of the assembly 300. The reflected wavelengths from the second filter continue along the remaining filters in the filter array 310 and are eventually separated and coupled out through the lens on the micro-lens array 306.

in addition to the thin-film filter block described above, other prior art constructs multiplexers and demultiplexers with prisms, arrayed waveguides (AWGs), or diffraction gratings. The prism based units rely on a transmissive material's index of refraction dispersion to spatially separate the wavelengths, and to get sufficient separation, the prisms become undesirably large, increasing weight and cost. The AWG operates on the phased array principle; they are very temperature sensitive, and they are inherently lossy (~3 dB) because there cannot be an infinite number of waveguides between the free-space regions, combined with the loss of injecting light from laser sources or fiber into the thin guides. The diffraction gratings are also inherently lossy, offering the highest diffraction efficiencies at only one angle or wavelength. Optical alignment between the discrete components in all the types of multiplexers is an important factor, where the AWG has the advantage that the number of components involved is more limited, since the multiplexing region is entirely photolithographically defined.

For example, the subassembly disclosed in U.S. Pat. No. 8,488,244 uses a substrate on which various components are accurately affixed to obtain acceptable optical alignment. The separate components (e.g., lens, etc.) are required to be accurately aligned and affixed to the substrate at tight tolerances, which involve challenging manufacturing steps. Specifically, various components must be assembled on the optical bench with optical alignment of the various optical components with sub-micron precision, in order to achieve the overall precision required to couple optical signals between the input and output of the Mux/Demux (i.e., from source to receiver). Optical alignment is more critical for single-mode operation, since most of or all of the optical components being used must be actively (manually) aligned to get good coupling of the light from source to receiver. This increases production/assembly costs and reduces yield, in addition to the challenges of achieving acceptable precision levels.

In the past, attempts were made to provide an injection molded polymer optical bench, which includes molded optics, and which could be coated with metallized thin film deposition to create reflective optics on the polymer optical bench. However, the tolerance of such polymer optical benches cannot meet the requirements for single-mode optical communications in a reliable and cost-effective manner.

What is needed is an improved subassembly for Mux/Demux, which improves manufacturability, throughput, tolerance, ease of use, functionality and reliability at reduced costs.

SUMMARY OF THE INVENTION

The present invention provides an improved structure for multiplexers/demultiplexers (Mux/Demux), which overcomes the drawbacks of the prior art. In accordance with the present invention, a Mux/Demux subassembly/module for routing optical signals is implemented in a stamped optical bench. The optical bench includes an array of stamped reflective surfaces for routing/redirecting optical signals, and may include an integrated structure for physically and optically coupling an optical component, e.g., an optical fiber, to an optical receiver and/or transmitter, which improves manufacturability, throughput, tolerance, ease of use and reliability at reduced costs, thereby overcoming many of the drawbacks of the prior art Mux/Demux structures.

In accordance with the present invention, alignment features and components of the Mux/Demux subassembly are integrally formed/defined on a stamped optical bench, defining a desired optical path with optical alignment at tight tolerances. In one embodiment, the stamped optical bench supports an optical component in the form of an optical waveguide (e.g., an optical fiber). In a more specific embodiment, the base of the optical bench defines an alignment structure in the form of at least one groove to precisely support the end section of an optical fiber. An optical element (e.g., a lens, a prism, a reflector, a mirror, etc.) may be provided in precise relationship to the end face of the optical fiber. The optical element comprises an array of structured reflective surfaces (e.g., micro mirrors), which may be planar reflective or concave reflective (e.g., an aspherical mirror surface), for routing optical signals to/from an array of receivers/transmitters outside of the Mux/Demux subassembly. The micro mirrors and the fiber alignment groove are integrally defined from the same piece of stock material (i.e., the alignment groove and the mirrors are part of a homogeneous monolithic structure).

The stamped optical Mux/Demux device has a stamped optical alignment platform that uses non-stamped thin-film filters to combine multiple sources of different wavelengths (via a stamped reflector) into a single beam and inject it into an optical fiber, or, working in the reverse direction, takes a beam containing multiple wavelengths and splits it into several one-wavelength beams, and delivers them each (via a stamped reflector) to a photodetector or an optical fiber. By using stamped micro mirror arrays in combination with thin-film bandpass filters as part of the optical system to do the optical signal splitting/combining, the mirrors and the alignment optical bench will be a stamped single-solid-body, and all of the optical components that are not stamped (fibers, thin film filters, possible ball lenses) will be aligned passively using alignment features defined within the stamped bench. The stamped optical bench will minimize the number of components that need to be actively aligned, reducing production costs and increasing yield and throughput.

A Mux/Demux having a stamped optical bench could have similar or smaller overall size and configuration, and similar or smaller footprint, compared to a prior art Mux/Demux using, e.g., a silicon optical bench. Stamped optical benches could be configured to have a smaller footprint and overall size than silicon optical benches. A stamped optical bench can effectively simplify the configuration of a silicon optical bench without compromising the desired defined optical path.

The optical bench is formed by stamping a malleable stock material (e.g., a metal stock), to form precise geometries and features of the optical bench. The optical bench subassembly can be structured to be hermetically sealed.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

Figure 1:
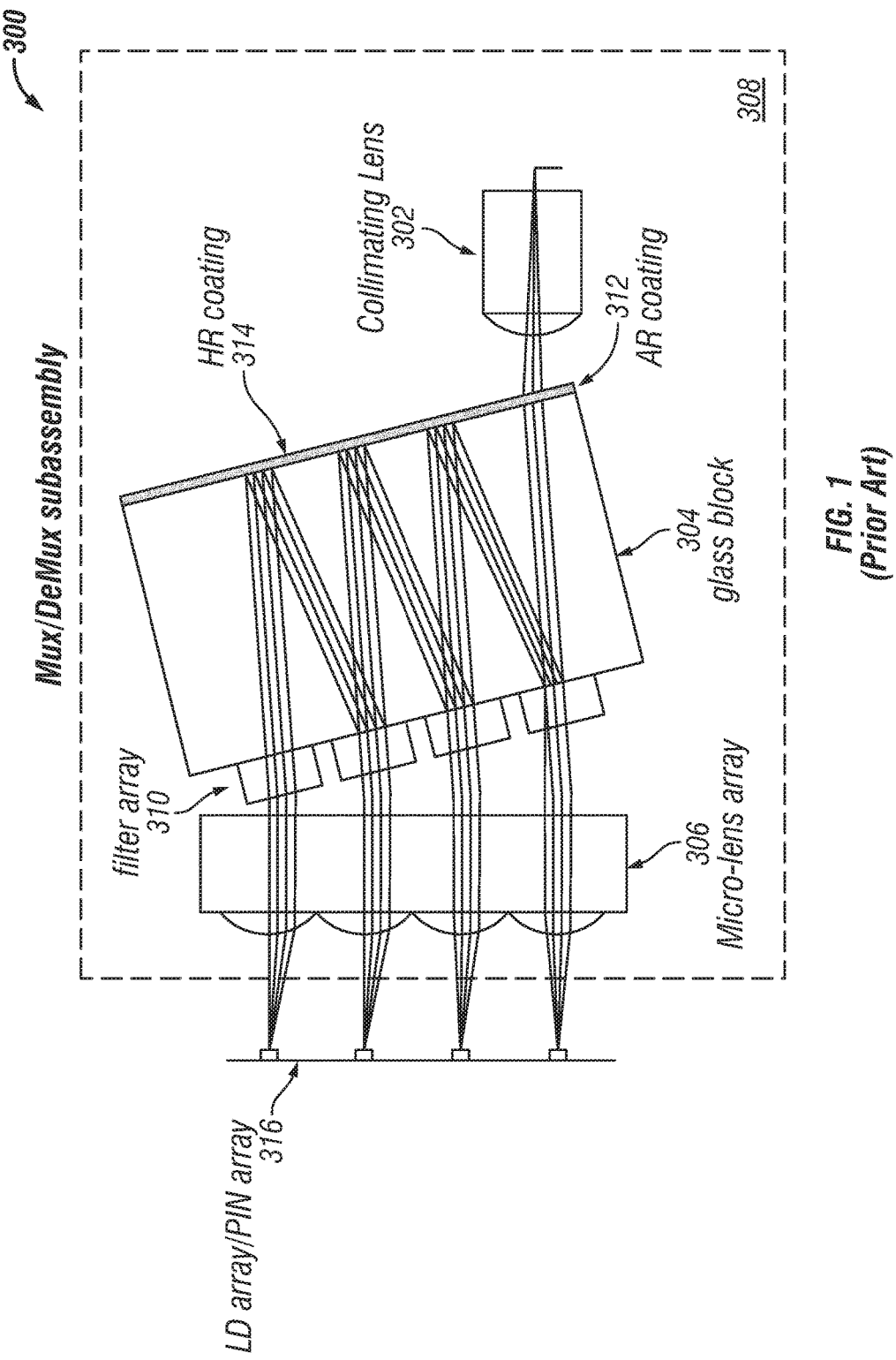
FIG. 1 is a schematic diagram of a prior art Mux/Demux subassembly.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides an improved structure for multiplexers/demultiplexers (Mux/Demux), which overcomes the drawbacks of the prior art. In accordance with the present invention, a Mux/Demux subassembly/module for routing optical signals is implemented in a stamped optical bench. The optical bench includes an array of stamped reflective surfaces for routing/redirecting optical signals, and may include an integrated structure for physically and optically coupling an optical component, e.g., an optical fiber, to an optical receiver and/or transmitter, which improves manufacturability, throughput, tolerance, ease of use and reliability at reduced costs, thereby overcoming many of the drawbacks of the prior art Mux/Demux structures.

Various embodiments of the present invention incorporate some of the inventive concepts developed by the Assignee of the present invention, nanoPrecision Products, Inc., including various proprietary including optical bench subassemblies for use in connection with optical data transmissions, including the concepts disclosed in the patent publications discussed below, which have been commonly assigned to the Assignee.

For example, U.S. Patent Application Publication No. US2013/0322818A1 discloses an optical coupling device for routing optical signals, which is in the form of an optical bench having a stamped structured surface for routing optical data signals. The optical bench comprising a metal base having a structured surface defined therein, wherein the structured surface has a surface profile that bends, reflects, and/or reshapes an incident light. The base further defines an alignment structure, which is configured with a surface feature to facilitate precisely positioning an optical component (e.g., an optical fiber) on the base in precise optical alignment with the structured surface to allow light to be transmitted along a defined path between the structured surface and the optical component, wherein the structured surface and the alignment structure are integrally defined on the base by stamping a malleable metal material to form an optical bench.

U.S. Patent Application Publication No. US2015/0355420A1 further discloses an optical coupling device for routing optical signals for use in an optical communications module, in particular an optical coupling device in the form of an optical bench, in which defined on a metal base is a structured surface having a surface profile that bends, reflects and/or reshapes an incident light. An alignment structure is defined on the base, configured with a surface feature to facilitate positioning an optical component (e.g., an optical fiber) on the base in optical alignment with the structured surface to allow light to be transmitted along a defined path between the structured surface and the optical component. The structured surface and the alignment structure are integrally defined on the base by stamping a malleable metal material of the base. The alignment structure facilitates passive alignment of the optical component on the base in optical alignment with the structured surface to allow light to be transmitted along a defined path between the structured surface and the optical component.

U.S. Patent Application Publication No. US2013/0294732A1 further discloses a hermetic optical fiber alignment assembly having an integrated optical element, in particular a hermetic optical fiber alignment assembly including an optical bench that comprises a metal ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping a malleable metal to define those features on a metal base.

U.S. Pat. No. 7,343,770 discloses a novel precision stamping system for manufacturing small tolerance parts. Such inventive stamping system can be implemented in various stamping processes to produce the devices disclosed in the above-noted patent publications. These stamping processes involve stamping a stock material (e.g., a metal blank), to form the final overall geometry and geometry of the surface features at tight (i.e., small) tolerances, including reflective surfaces having a desired geometry in precise alignment with the other defined surface features.

U.S. Patent Application Publication No. US2016/0016218A1 further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment feature, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the stock material that is subjected to stamping is a homogenous material (e.g., a strip of metal, such as Kovar, aluminum, etc.) The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses.

U.S. Pat. No. 8,961,034 discloses a method of producing a ferrule for supporting an optical fiber in an optical fiber connector, comprising stamping a metal blank to form a body having a plurality of generally U-shaped longitudinal open grooves each having a longitudinal opening provided on a surface of the body, wherein each groove is sized to securely retain an optical fiber in the groove by clamping the optical fiber. The optical fiber is securely retained in the body of the ferrule without the need for additional fiber retaining means.

The above inventive concepts are incorporated by reference herein, and will be referred below to facilitate disclosure of the present invention. The present invention is disclosed in connection with exemplary embodiments of hermetic optical fiber feedthrough for hermetic optoelectronic packages, which includes an optical bench subassembly with an integrated photonic device.

Figure 2:
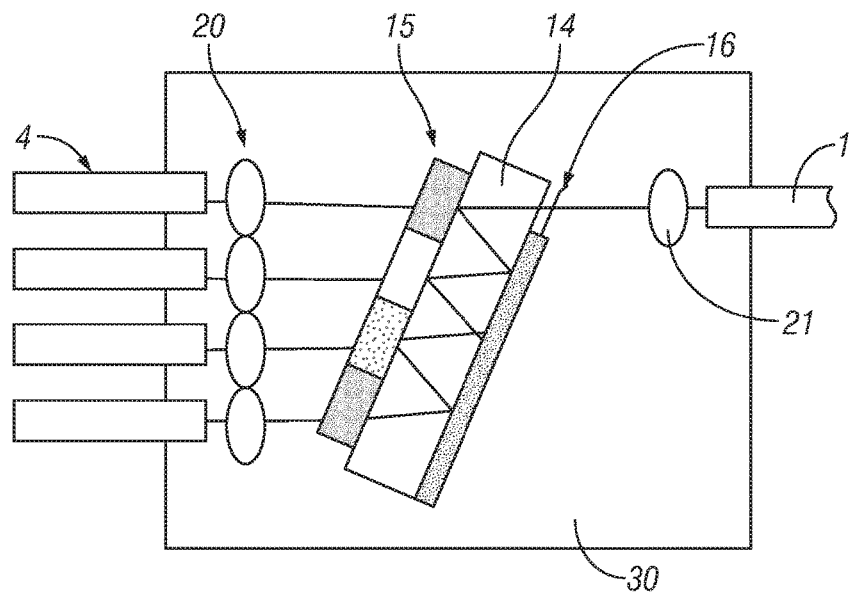
FIG. 2 is a schematic diagram of a Mux/Demux subassembly in accordance with one embodiment of the present invention.

FIG. 2 schematically illustrates the components and optical paths in a Mux/Demux subassembly 10, in accordance with one embodiment of the present invention. The configuration of the subassembly 10 may be deployed as a multiplexer or demultiplexer, depending on the direction of the optical signal. In the illustrated embodiment, the subassembly 10 is configured for input signals of four different wavelengths to be combined (i.e., multiplexed) into a single output signal, or a single input signal to be split (demultiplexed) into four output signals of different wavelength. The subassembly 10 includes an optical bench 30, which supports a transparent block 14 having an array of thin film filters 15 (each having a particular transmissive wavelength to allow optical signal of the respective wavelength to pass through) and a mirror 16 provided on opposing surfaces. An array of micro mirrors 20 are defined (by stamping the optical bench, as discussed further below) on the optical bench 30, corresponding to the four inputs/outputs of the subassembly 10, and a lens or mirror 21 corresponding to the single output/input of the subassembly 10. In this embodiment, the inputs and outputs are represented by optical fibers, which may be optically coupled to receivers (Rx; e.g., a photodiode) and/or transmitters (Tx; e.g., a laser such as a VCSEL).

In a demultiplexer operation, input light signal from the optical fiber 1 is collimated by the mirror or lens 21 and directed at the filter block 14. The signal is reflected between the thin film filters 15 and the mirror 16, with the thin film filters reflecting all but the transmission wavelength. Each output light signal is directed (i.e., turned) by the corresponding micro mirror 20 to an optical fiber 4 (the fiber 4 may be replaced by a transmitter, a receiver or a transceiver). In a multiplexer operation, the optical paths are in reverse. The input light signals from the optical fiber 4 are directed (i.e., turned) by the corresponding mirror 20 to the filter block 14, which are reflected within the filter block 14 to be output to the lens or mirror 21 to be focused and directed at the optical fiber 1. The particular illustrated optical paths in FIG. 2 were configured in prior art systems, except that none of those systems incorporates a stamped optical bench having stamped micro mirrors in accordance with the present invention.

Figure 3A:
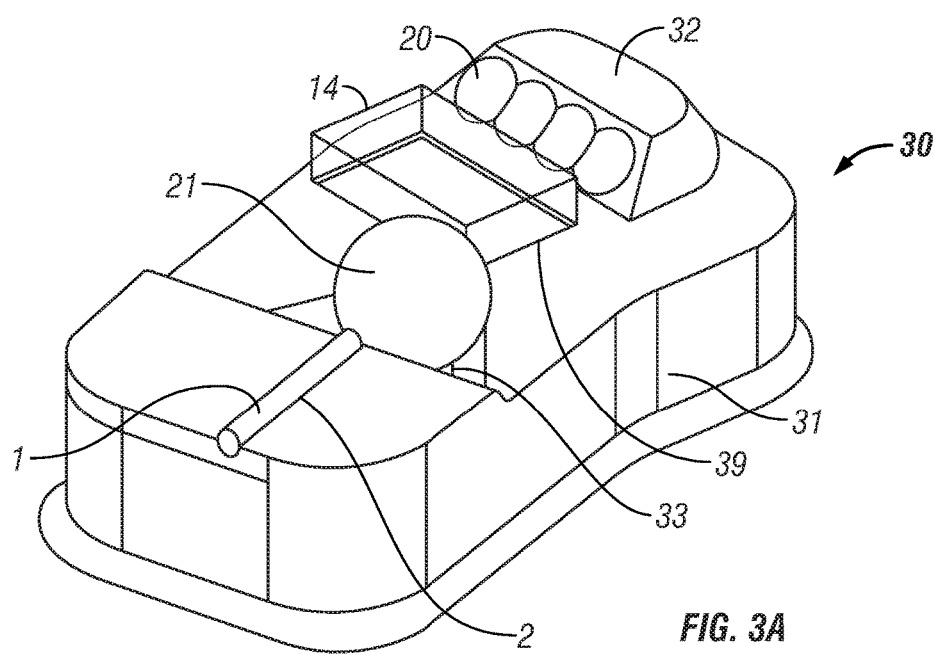
FIGS. 3A to 3C illustrates the structure of the Mux/Demux subassembly having a stamped optical bench in accordance with one embodiment of the present invention.
Figure 3B:
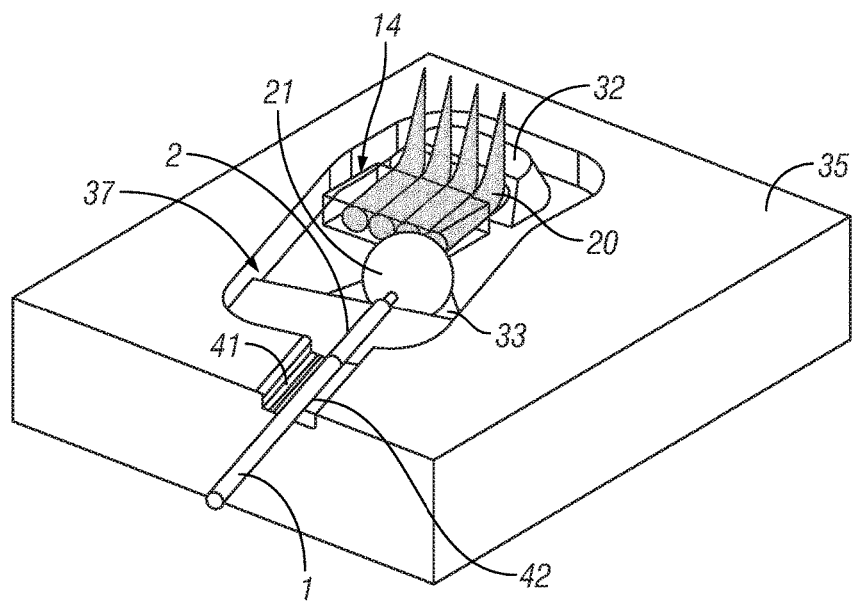

In accordance with the present invention, the array of micro mirrors 20 is provided on a stamped optical bench. Referring to FIGS. 3A to 3B, alignment features and components of the Mux/Demux subassembly 10 are integrally formed on a stamped optical bench 30, defining the optical path shown in FIG. 2, with optical alignment at tight tolerances. In the illustrated embodiment, the stamped optical bench 30 supports the filter block 14 (having the thin film filters 15 and mirror 16), the lens 21, and the optical fiber 1. The base 31 of the optical bench 30 defines an alignment structure in the form of a groove 2 to precisely support the end section of the optical fiber 1. The base 31 of the optical bench 20 also defines a slot 33 (e.g., a spherical or tetrahedral depression) to support the ball lens 21 (or a reflector, a mirror, etc.) in precise relationship to the end face of the optical fiber 1, and further an additional alignment feature 39 (e.g., a step) for accurately, and passively, aligning the filter block 14 along the desired optical path. The optical element comprising the array of structured reflective surfaces (e.g., micro mirrors 20, which may be planar reflective or concave reflective (e.g., an aspherical mirror surface)) is stamped formed at an incline of an extended feature 32 at the top surface of the base 31, for routing optical signals to/from an array of receivers/transmitters outside of the Mux/Demux subassembly 10. The pitch of the micro mirrors 20 may be, for example, 250 micrometers.

In experiments with actual optical design, it was found that in the MUX operation from four single-mode sources, the geometric coupling losses range from 0.17 dB for the lowest optical path channel to 0.36 dB for longest path. This calculation was performed using ray-based Gaussian beamlets, and computing overlap integrals from the reconstructed field at the fiber core. The pitch of the micro mirror array in this design is 250 microns.

The variation from channel-to-channel is a result of the small pitch, which limits the collimation of the field, so the channels with longer optical path lengths have more physical distance to diverge before reaching the fiber. If the pitch is increased, the disparity decreases.

As shown in FIG. 3A, the optical bench 30 is shown alone after stamp forming. Before the surface feature are formed by stamping on the base 31, a metallic "rivet", e.g., made from a soft material such as aluminum, is inserted into an opening 37 in a frame having a body 35. Referring to also to FIG. 3B, the optical bench is formed after inserting the aluminum rivet into the frame body 35. The aluminum rivet is stamped with the surface features shown along with a portion of the frame body 35 (e.g., the channel 41 having a groove 42 defined therein for receiving a section of the optical fiber 1). This "rivet" type stamping approach and its features and benefits are disclosed in U.S. Patent Application Publication No. US2016/0016218A1, which has been commonly assigned to the Assignee of the present invention. Details of such stamping process is not discussed herein, but incorporated by reference herein.

The aluminum rivet is easily formable by stamping, and it has high reflectance in the wavelength range adopted in telecommunications and data communications. The material of the frame body 35 may be Kovar. Specifically, in the above described embodiments, pure aluminum is chosen for the rivet for forming the optical bench because it is relatively softer, and more malleable/ductile than Kovar chosen for the frame, to obtain the desired geometries, dimensions and/or finishes of critical features (e.g., the micro mirrors 20) at the optical bench 30. The harder and stronger frame material (e.g., Kovar) is chosen to form structures that require the integrity of a harder material, but stamping the harder base material would require larger forces and result in more springback, requiring multiple hits of the stamping punch to obtain the desire shape. In contrast, the relatively softer material chosen for stamping the optical bench 30 requires less stamping forces and results in less springback, requiring relatively fewer hits (e.g., just one hit) of the stamping punch to obtain the final stamped part. Hence, micro features can be stamped on the optical bench 30 with very tight dimensional tolerances. The harder frame material also functions as part of the die, which partially shapes the optical bench 30 during stamping operation. The coefficient of thermal expansion for Kovar material also closely matches the coefficient of thermal expansion of most semiconductor and glass materials so that temperature changes induce minimal misalignment between the components. Furthermore, the melting temperatures of the metallic optical bench are sufficiently high to allow for compatibility with soldering processes that are commonly used in electronic and photonic packaging.

Figure 3C:
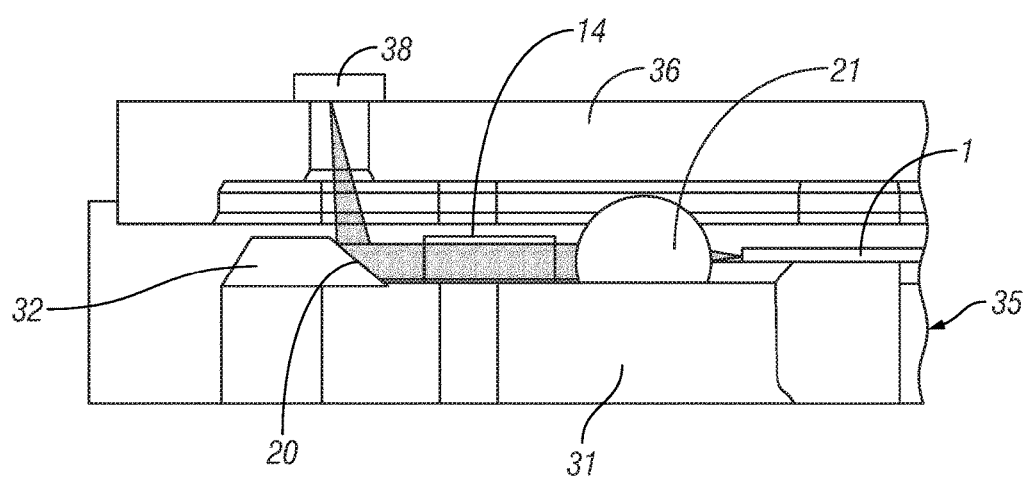

Referring to FIG. 3C, an upper cover 36 may be provided above the frame 35. The cover 36 may be stamped formed to include, for example, alignment depressions for a photodetector/light source 38 (or a transceiver Tx/Rx), fiber arrays (e.g., optical fibers 4 shown in FIG. 2), etc. The frame 35 and cover 36 may be stamped with complementary self-aligning features (e.g., complementary protrusions and depressions), such that when the cover 36 is placed over the frame 35, the optical path from the optical bench 30 is accurately aligned to the optical components/elements supported by the cover 36.

Figure 4:
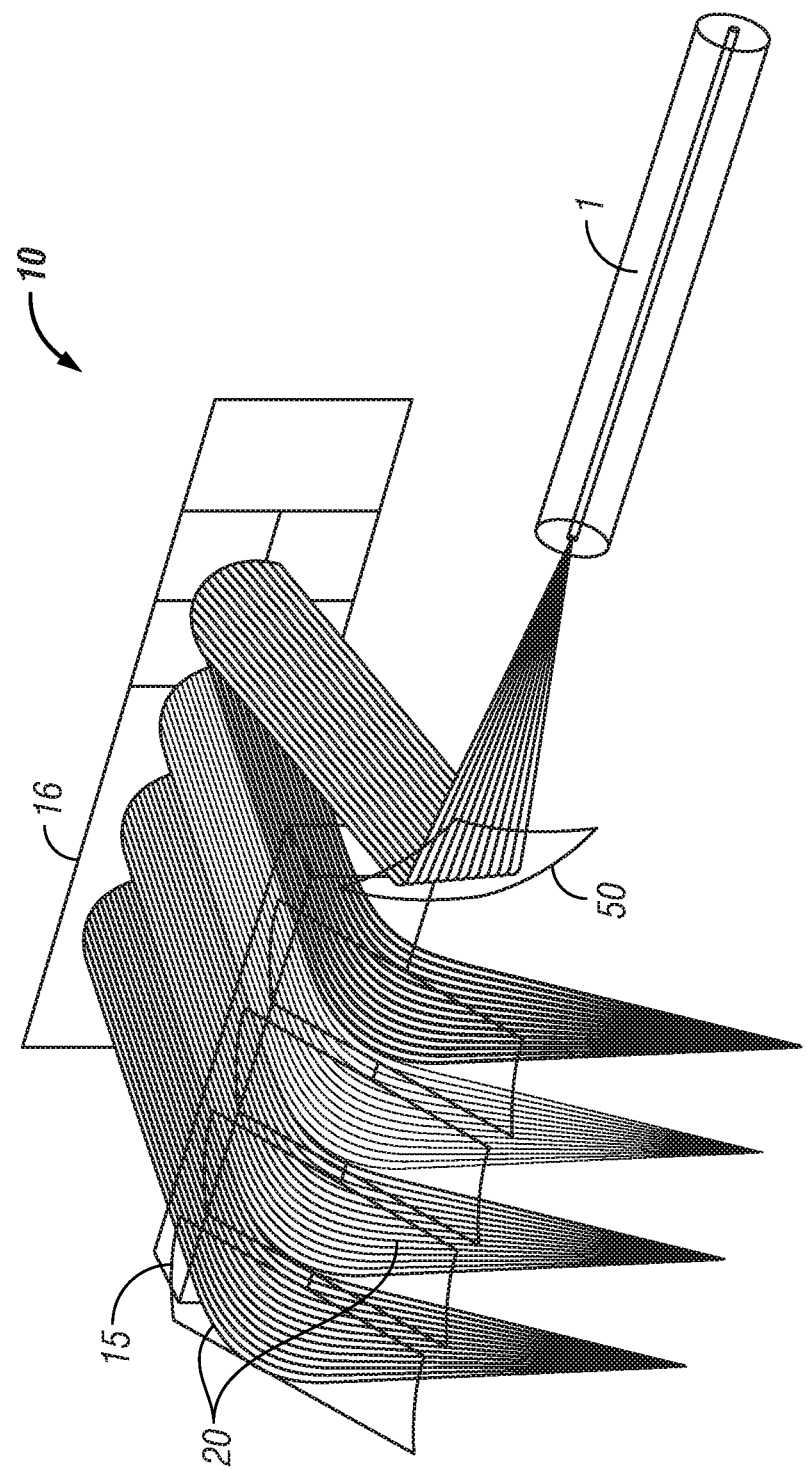
FIG. 4 schematically illustrates a Mux/Demux subassembly in accordance with another embodiment of the present invention.

FIG. 4 is a schematic illustrating another embodiment of a De/Mux subassembly 10' in accordance with the present invention (the block 14 has been omitted from view). Instead of a ball lens 21 in FIG. 3A, a micro mirror 50 may be stamped formed on the optical bench, to collimate light from the optical fiber 1 to the filter block 14, or focus light to the optical fiber 1 from the filter block 14.

Given that the micro mirrors 20 and the fiber alignment groove 2 are stamped in a single stroke by the same tool when forming the optical bench, the alignment precision between the optical fiber 1 and the array of micro mirrors 20 could be on the order of 200 nanometers. This is completely passive alignment, thus avoiding the tedious and more complex active alignment practice in the prior art. The other alignment features for the ball lens 21 (or mirror 50 in FIG. 4) and the filter block 14 may also be integrally stamped in a single step with the mirrors 20 and the fiber alignment groove 2, to provide accurate passive alignment of these components.

In view of the above disclosure, it can be seen that the stamped optical Mux/Demux subassembly in accordance with the present invention uses a stamped optical alignment platform that uses non-stamped thin-film filters to combine multiple sources of different wavelengths (via a stamped reflector) into a single beam and inject it into an optical fiber, or, working in the reverse direction, takes a beam containing multiple wavelengths and splits it into several one-wavelength beams, and delivers them each (via a stamped reflector) to a photodetector or an optical fiber. By using stamped micro mirror arrays in combination with thin-film bandpass filters as part of the optical system to do the optical signal splitting/combining, the mirrors and the alignment optical bench will be a stamped single-solid-body, and all of the optical components that are not stamped (fibers, thin film filters, possible ball lenses) can be aligned passively using features defined within the stamped bench. The stamped optical bench will minimize the number of components that need to be actively aligned, reducing production costs and increasing yield and throughput.

More specifically, in the above described embodiment of FIGS. 3A to 3C, by including the groove 2, alignment features 33 and 39, etc. on the same, single optical bench structure that also defines the structured reflective surface (i.e., micro mirrors 20), the alignment of the end section of the optical fiber 1 to the structured mirror 20 can be more precisely achieved with relatively smaller tolerances by a single final stamping to simultaneous define the final structure on a single part, as compared to trying to achieve similar alignment based on features defined on separate parts or structures. By forming the mirror 20, the optical fiber alignment structure/groove 2 and the alignment features 33 and 39 simultaneously in a same, single final stamping operation, dimensional relationship of the features/components requiring (or play a role in providing) alignment on the same work piece/part can be maintained in the final stamping step. Further, the material for the optical bench may be chosen to possess a high reflective efficiency (e.g., pure Aluminum) that is desirable for the structured reflective surfaces/mirrors 20 having high optical reflectance, and the dissimilar material for the frame body 35 may be chosen to possess desirable properties, such as high rigidity, low coefficient of thermal expansion, etc.

A Mux/Demux having a stamped optical bench could have similar or smaller overall size and configuration, and similar or smaller footprint, compared to a prior art Mux/Demux using, e.g., a silicon optical bench. Stamped optical benches could be configured to have a smaller footprint and overall size than silicon optical benches. A stamped optical bench can effectively simplify the configuration of a silicon optical bench without compromising the desired defined optical path.

The Mux/Demux subassembly 10 is suited for single-mode, or multi-mode, and the sources may be fibers, or grating couplers, or VCSEL's, or DFB lasers. The receiver for the light output may be any kind of light sensitive detector, or any kind of fiber, or grating couplers, or any kind of waveguide. The Mux/Demux may involve coarse wavelength division multiplexing (CWDM) or dense wavelength division multiplexing (DWDM), and involve any number of wavelengths or channels, beyond the four channels illustrated in the illustrated embodiments.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. An optical subassembly, comprising:
   a stamped optical bench comprising at least one mirror and at least one groove for aligning an optical fiber defined thereon by stamping a malleable metal stock material; and
   an optical element supported on the optical bench, wherein the optical element directs an optical signal between the optical fiber and the mirror
   wherein said at least one mirror and said at least one groove are integrally formed together by stamping the malleable metal stock material, to integrally defined said at least one mirror and said at least one groove from the same malleable metal stock material, wherein relative positions of the integrally defined said at least one mirror and said at least one groove are passively aligned.

2. The optical subassembly as in claim 1, wherein the optical bench comprises a plurality of mirrors, wherein the optical element directs the optical signal between the optical fiber and the plurality of mirrors.

3. The optical subassembly as in claim 2, wherein the plurality of mirrors and the groove are integrally formed together by stamping the malleable metal stock material, to integrally defined the plurality of mirrors and the groove from the same malleable metal stock material, wherein relative positions of the integrally defined plurality of mirrors and the groove are passively aligned.

4. The optical subassembly as in claim 3, further comprising an alignment feature defined on the optical bench to align the optical element.

5. The optical subassembly as in claim 4, wherein the alignment feature comprises a depression for positioning a ball lens.

6. The optical subassembly as in claim 4, wherein the optical bench further comprising a stamped mirror aligned with the groove for directing light to/from the optical fiber.

7. The optical subassembly as in claim 2, wherein the groove and the plurality of mirrors are part of a homogeneous monolithic structure.

8. The optical subassembly as in claim 2, wherein the optical element multiplexes and/or demultiplexes the optical signal between the optical fiber and the plurality of mirrors.

9. The optical subassembly as in claim 1, wherein said at least one mirror comprises an aspherical concave reflective profile.

10. A method of forming an optical subassembly as in claim 2, wherein the optical element directs the optical signal between the optical fiber and the plurality of mirrors, and wherein the optical element multiplexes and/or demultiplexes the optical signal between the optical fiber and the plurality of mirrors.

11. A method of forming an optical subassembly, comprising:

forming an optical bench comprising at least one mirror and at least one groove for aligning an optical fiber defined thereon by stamping a malleable metal stock material; and supporting an optical element on the optical bench, wherein the optical element directs an optical signal between the optical fiber and the mirror.

12. The method as in claim 11, wherein the optical bench comprises a plurality of mirrors, wherein the optical element directs the optical signal between the optical fiber and the plurality of mirrors.

13. The method as in claim 12, wherein the plurality of mirrors and the groove are integrally formed together by stamping the malleable metal stock material, to integrally defined the plurality of mirrors and the groove from the same malleable metal stock material, wherein relative positions of the integrally defined plurality of mirrors and the groove are passively aligned.

14. The method as in claim 13, further comprising defining an alignment feature on the optical bench to align the optical element.

15. The method as in claim 14, wherein the alignment feature defines a depression for positioning a ball lens.

16. The method as in claim 13, further comprising defining on the optical bench a stamped mirror aligned with the groove for directing light to/from the optical fiber.

17. The method as in claim 12, wherein the grooves and the plurality of mirrors are integrally defined to be part of a homogeneous monolithic structure.

18. The method as in claim 12, wherein the optical element multiplexes and/or demultiplexes the optical signal between the optical fiber and the plurality of mirrors.

19. A method of forming a Mux/Demux subassembly, comprising the method of claim 11, wherein the optical bench comprises a plurality of mirrors, wherein the optical element directs the optical signal between the optical fiber and the plurality of mirrors, and wherein the optical element multiplexes and/or demultiplexes the optical signal between the optical fiber and the plurality of mirrors.

20. The method as in claim 11, wherein said at least one mirror comprises an aspherical concave reflective profile.

* * * * *